US012800017B2

(12) United States Patent
Furukawa et al.

(10) Patent No.: US 12,800,017 B2
(45) Date of Patent: Nov. 17, 2026

(54) DRIVE DEVICE

(71) Applicants: TOYOTA JIDOSHA KABUSHIKI KAISHA, Toyota (JP); JTEKT CORPORATION, Kariya (JP)

(72) Inventors: Tomoaki Furukawa, Toyota (JP); Satoshi Kasamai, Miyoshi (JP); Hiroshi Takuno, Nukata-gun (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 0 days.

(21) Appl. No.: 19/372,889

(22) Filed: Oct. 29, 2025

(65) Prior Publication Data

US 2026/0117851 A1 Apr. 30, 2026

(30) Foreign Application Priority Data

Oct. 31, 2024 (JP) ................................ 2024-192348

(51) Int. Cl.
*F16H 48/20* (2012.01)
*F16H 48/06* (2006.01)
*F16H 48/42* (2012.01)

(52) U.S. Cl.
CPC ............ *F16H 48/20* (2013.01); *F16H 48/06* (2013.01); *F16H 48/42* (2013.01); *F16H 2048/423* (2013.01)

(58) Field of Classification Search
CPC .................... F16H 48/20; F16H 48/22; B60K 2001/001; B60K 2007/0061; B60K 2007/0092
See application file for complete search history.

(56) References Cited

U.S. PATENT DOCUMENTS 10,989,297 B2 * 4/2021 Guarino ............ F16H 57/0471
2015/0211619 A1 7/2015 Cooper

FOREIGN PATENT DOCUMENTS

JP 2014-132178 A 7/2014
JP 2015-137767 A 7/2015
JP 2023-150297 A 10/2023

* cited by examiner

*Primary Examiner* — Derek D Knight
(74) *Attorney, Agent, or Firm* — Sughrue Mion, PLLC

(57) ABSTRACT

A drive device includes a motor, a motor shaft, a planetary gear mechanism in which the motor shaft is fixed to a sun gear, a differential gear in which a differential case is mechanically connected to a carrier, a first output shaft, a second output shaft, an inboard drive shaft fixed to the other end of the second output shaft, a differential limiting mechanism including ring-shaped clutch plates about a central axis of the second output shaft, and a casing. An outside diameter of the inboard drive shaft about the central axis is smaller than a bore diameter of the clutch plates. Part of the casing is disposed between the differential limiting mechanism and the inboard drive shaft, and covers the differential limiting mechanism. The casing has a recess on a surface that faces the inboard drive shaft. An end of the inboard drive shaft is positioned inside the recess.

5 Claims, 2 Drawing Sheets

DRIVE DEVICE

CROSS-REFERENCE TO RELATED APPLICATION

This application claims priority to Japanese Patent Application No. 2024-192348 filed on Oct. 31, 2024. The disclosure of the above-identified application, including the specification, drawings, and claims, is incorporated by reference herein in its entirety.

BACKGROUND

1. Technical Field

The technology disclosed in the present specification relates to a drive device for a vehicle.

2. Description of Related Art

Japanese Unexamined Patent Application Publication No. 2023-150297 (JP 2023-150297 A) discloses a drive device for a vehicle in which a motor and a gear unit are integrated. In the drive device, a motor shaft to be driven by the motor and an output shaft for driving wheels are disposed coaxially.

SUMMARY

A differential limiting mechanism that limits a differential action of a differential gear may be added by being integrated with the drive device. In this case, the size of the drive device in the axial direction may increase.

A drive device for a vehicle disclosed in the present specification includes: a motor; a motor shaft to be driven by the motor; a planetary gear mechanism including a sun gear, a ring gear, a carrier, and planetary gears, the motor shaft being fixed to the sun gear; a differential gear including a differential case, the differential case being mechanically connected to the carrier; a first output shaft including one end connected to the differential gear and the other end passing through the motor shaft; a second output shaft disposed coaxially with the first output shaft and including one end connected to the differential gear; an inboard drive shaft fixed to the other end of the second output shaft; a differential limiting mechanism configured to limit a differential action of the differential gear, the differential limiting mechanism being disposed between the differential gear and the inboard drive shaft and including ring-shaped clutch plates about a central axis of the second output shaft; and a casing that houses the motor, the planetary gear mechanism, the differential gear, and the differential limiting mechanism. An outside diameter of the inboard drive shaft about the central axis is smaller than a bore diameter of the clutch plates. Part of the casing is disposed between the differential limiting mechanism and the inboard drive shaft, and covers the differential limiting mechanism. The casing that covers the differential limiting mechanism has a recess on a surface that faces the inboard drive shaft. An end of the inboard drive shaft is positioned inside the recess.

In the above configuration, the outside diameter of the inboard drive shaft is smaller than the bore diameter of the clutch plates of the differential limiting mechanism. The end of the inboard drive shaft is positioned inside the recess formed in the casing that covers the differential limiting mechanism. Thus, it is possible to reduce the size of the drive device in the axial direction by an amount that the end of the inboard drive shaft enters the recess. In the drive device additionally integrated with the differential limiting mechanism, it is possible to suppress an increase in the size in the axial direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The recess may be provided in a region within the bore diameter of the clutch plates when viewed in a direction of the central axis.

With the above configuration, it is possible to realize a structure in which the end of the inboard drive shaft enters the recess.

The casing that covers the differential limiting mechanism may include a first surface disposed around the second output shaft and substantially perpendicular to the central axis. The casing that covers the differential limiting mechanism may include a second surface disposed around the first surface, covering the clutch plates, and substantially perpendicular to the central axis, the second surface protruding closer to the inboard drive shaft than the first surface. An end position of the inboard drive shaft in a direction of the central axis may be between the first surface and the second surface.

With the above configuration, it is possible to reduce the size of the drive device in the direction of the central axis by an amount that the end of the inboard drive shaft extends toward the differential gear beyond the second surface.

The differential limiting mechanism may be configured to switch: a mode in which the second output shaft is allowed to rotate relative to the differential case; and a mode in which the second output shaft is forbidden to rotate relative to the differential case.

With the above configuration, the differential action of the differential gear can be exerted by allowing the second output shaft to rotate relative to the differential case. The differential action of the differential gear can be limited by forbidding the relative rotation.

The differential limiting mechanism may include a first plate, a second plate, and a cam ball. The first plate may be fixed to the casing, and have a through hole through which the differential case and the second output shaft pass. The second plate may be disposed to face the first plate in a direction of the central axis, rotatable about the central axis and movable in the direction of the central axis, and mechanically connected to the clutch plates. The cam ball may be sandwiched between the first plate and the second plate. A bearing that supports the differential case such that the differential case is rotatable relative to the casing may be fixed to the first plate near the through hole.

With the above configuration, the first plate of the differential limiting mechanism can also function as a member for supporting the bearing for the differential case. The number of components can be reduced compared to a case where a dedicated member for supporting the bearing is provided. Therefore, the cost and size of the drive device can be reduced.

Configuration of Drive Device 1

Figure 1:
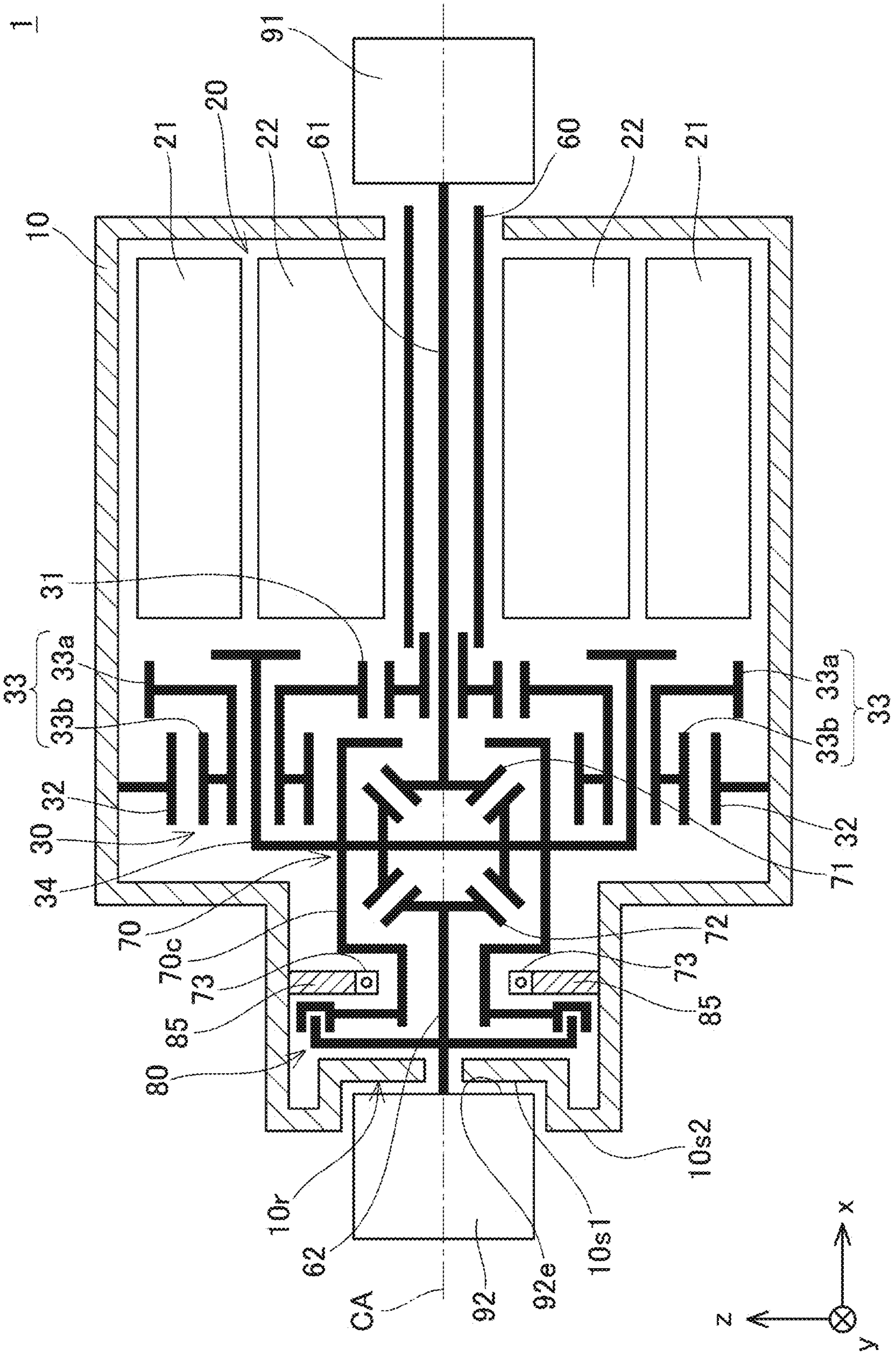
FIG. 1 is a skeleton diagram showing a schematic configuration of a drive device 1.
Figure 2:
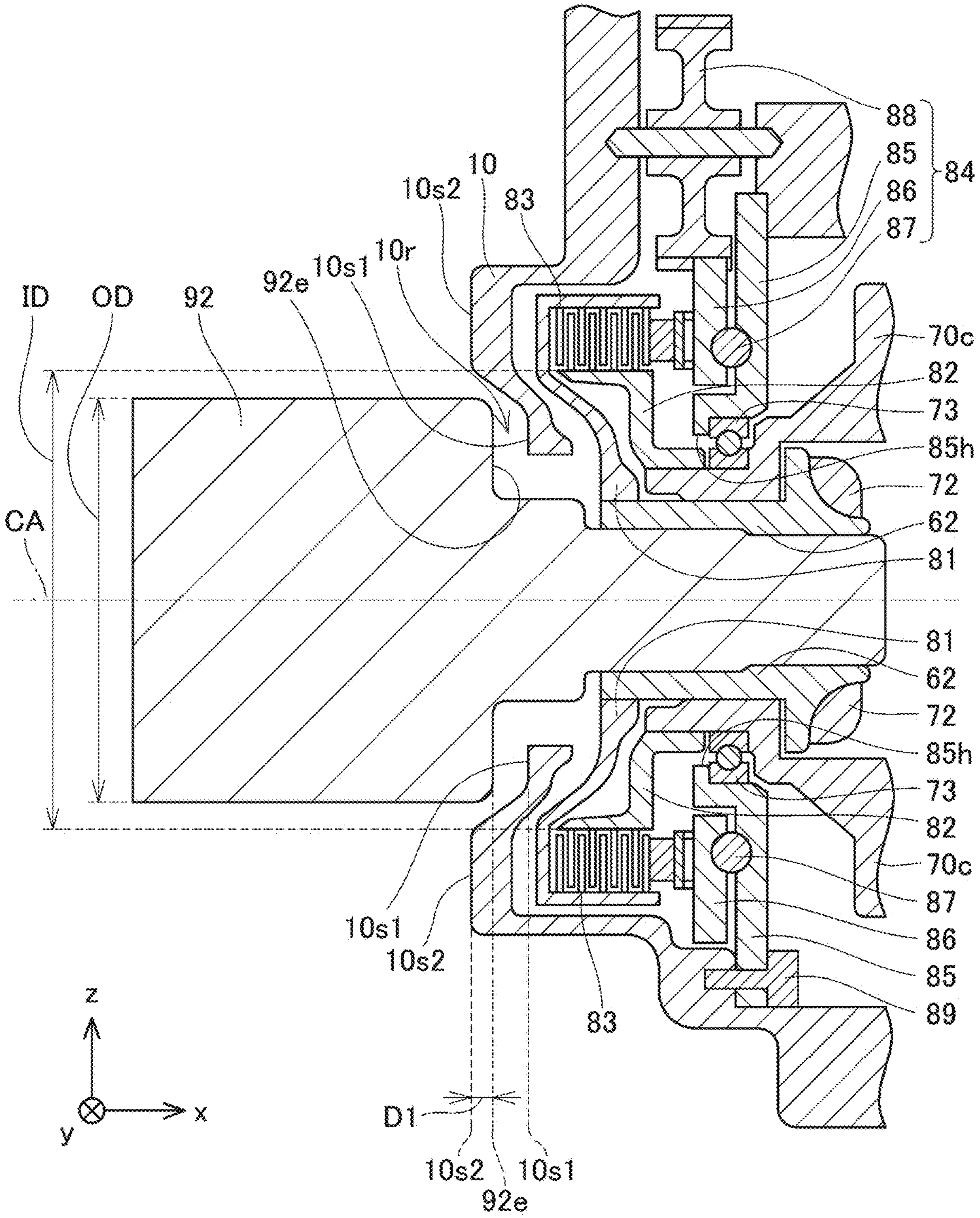
FIG. 2 is a sectional view of the vicinity of a second output shaft 62.

FIG. 1 is a skeleton diagram for describing the structure of a drive device 1 according to the present embodiment. The drive device 1 drives a pair of right and left wheels (not shown) of a battery electric vehicle. The drive device 1 is an integrated device in which a motor, a gear unit, and a power conversion unit for controlling the motor are housed in the same casing. In FIG. 1, the axial direction of a motor shaft 60, a first output shaft 61, and a second output shaft 62 is defined as an x direction. A casing 10 is shown in a sectional view, and the components of the casing 10 are hatched. FIG. 2 is a sectional view of the vicinity of the second output shaft 62.

The drive device 1 includes the casing 10. The casing 10 may be a casting. The casing 10 mainly houses a motor 20, a planetary gear mechanism 30, the motor shaft 60, the first output shaft 61, the second output shaft 62, a differential gear 70, and a differential limiting mechanism 80.

The motor 20 includes a stator 21, a rotor 22, and the motor shaft 60. The stator 21 has a cylindrical shape. The rotor 22 is rotatably disposed inside the stator 21. The motor shaft 60 is fixed to the rotor 22. The motor shaft 60 has a hollow structure and is supported by a bearing (not shown).

The planetary gear mechanism 30 includes a sun gear 31, a ring gear 32, stepped pinion gears 33, and a carrier 34. The sun gear 31 is fixed to the end of the motor shaft 60 in a-x direction. In the stepped pinion gear 33, a large diameter pinion 33*a* and a small diameter pinion 33*b* are formed integrally. The large diameter pinion 33*a* meshes with the sun gear 31, and the small diameter pinion 33*b* meshes with the ring gear 32. The ring gear 32 is fixed to the casing 10. The carrier 34 is fixed to a differential case 70*c* of the differential gear 70. Therefore, a driving force input from the motor 20 to the sun gear 31 is transmitted to the differential case 70*c* via the stepped pinion gears 33 and the carrier 34.

The differential gear 70 is a mechanism that distributes the driving force transmitted via the differential case 70*c* to the pair of right and left output shafts, that is, the first output shaft 61 and the second output shaft 62. The end of the differential case 70*c* near the second output shaft 62 is rotatably supported by a bearing 73. Since the structure of the differential gear 70 is well known, detailed description thereof will be omitted.

The first output shaft 61 and the second output shaft 62 are disposed coaxially with each other and have a common central axis CA. The first output shaft 61 and the second output shaft 62 are shafts for outputting the driving force to a pair of tires (not shown). A side gear 71 of the differential gear 70 is fixed to the end of the first output shaft 61 on the −x direction side. The end of the first output shaft 61 on a +x direction side passes through the motor shaft 60 and is connected to an inboard drive shaft 91. A side gear 72 of the differential gear 70 is fixed to the end of the second output shaft 62 on the +x direction side. An inboard drive shaft 92 is fixed to the end of the second output shaft 62 on the −x direction side. The inboard drive shafts 91 and 92 each have a cylindrical shape about the central axis CA.

Configuration and Operation of Differential Limiting Mechanism 80

The specific configuration of the differential limiting mechanism 80 will be described with reference to FIG. 2. The differential limiting mechanism 80 limits a differential action of the differential gear 70. The differential limiting mechanism 80 is disposed between the differential gear 70 and the inboard drive shaft 92. The differential limiting mechanism 80 mainly includes an outer clutch 81, a center clutch 82, clutch plates 83, and a pressing mechanism 84. The outer clutch 81 is fixed to the outer periphery of the second output shaft 62. The center clutch 82 is fixed to the outer periphery of the differential case 70*c*. The outer clutch 81 and the center clutch 82 are rotatable relative to each other. The clutch plates 83 each have a ring shape about the central axis CA and include a plurality of outer clutch plates 83*o* and a plurality of inner clutch plates 83*i*. The outer clutch plates 83*o* and the inner clutch plates 83*i* are disposed alternately in the axial direction (x direction). The outer clutch plates 83*o* are engaged with the outer clutch 81 while being rotatable together with the outer clutch 81. The inner clutch plates are engaged with the center clutch 82 while being rotatable together with the center clutch 82.

Each clutch plate 83 has a bore diameter ID about the central axis CA. The inboard drive shaft 92 has an outside diameter OD about the central axis CA. The outside diameter OD is smaller than the bore diameter ID.

The pressing mechanism 84 is a ball cam mechanism. The pressing mechanism 84 mainly includes a first plate 85, a second plate 86, cam balls 87, and a gear portion 88. The first plate 85 is fixed to the casing 10 by a fastening member 89 in a non-rotatable manner. The first plate 85 has an annular shape and has a through hole 85*h* through which the differential case 70*c* and the second output shaft 62 pass. The bearing 73 is fixed near the through hole 85*h*. The second plate 86 is disposed on the −x direction side of the first plate 85. The second plate 86 is a member that is mechanically connected to the center clutch 82. The second plate 86 has an annular shape and is rotatable about the central axis and movable in the −x direction. A gear 86*g* is formed on the outer periphery of the second plate 86. The second plate 86 is urged by an urging member (not shown) in a direction (+x direction) in which the clutch plates 83 are disconnected. The cam balls 87 are sandwiched between the facing surfaces of the first plate 85 and the second plate 86.

The gear portion 88 is mechanically connected to an electric motor (not shown). The gear portion 88 meshes with the gear 86*g* of the second plate 86. Therefore, the rotation of the electric motor is reduced in speed by the gear portion 88 and transmitted to the second plate 86. Thus, the second plate 86 can be rotated about the central axis CA.

The operation of the differential limiting mechanism 80 will be described. When the electric motor is rotated in a forward direction, differential rotation occurs between the first plate 85 and the second plate 86. Therefore, a force (cam thrust force) is generated by the cam balls 87 to press the center clutch 82 in the axial direction toward the clutch plates 83 (−x direction). The outer clutch plates 83*o* and the inner clutch plates 83*i* are pressed and the differential limiting mechanism 80 is connected. Therefore, the second output shaft 62 is forbidden to rotate relative to the differential case 70*c*. Thus, the differential action of the differential gear 70 is limited.

When the electric motor is rotated in a reverse direction, the differential rotation does not occur between the first plate 85 and the second plate 86. The second plate 86 is moved by the urging member (not shown) in the axial direction away from the clutch plates 83 (+x direction). Therefore, the differential limiting mechanism 80 is released. Therefore, the second output shaft 62 is allowed to rotate relative to the differential case 70*c*. Thus, the differential action of the differential gear 70 is exerted.

Disposition Relationship Between Differential Limiting Mechanism 80 and Inboard Drive Shaft 92

As shown in FIG. 2, part of the casing 10 is disposed between the differential limiting mechanism 80 and the inboard drive shaft 92. That is, the differential limiting mechanism 80 is covered by part of the casing 10.

The casing 10 covering the differential limiting mechanism 80 includes a first surface 10*s*1 and a second surface 10*s*2. The first surface 10*s*1 is disposed around the second output shaft 62 and substantially perpendicular to the central axis CA. The first surface 10*s*1 is disposed in a region within the bore diameter ID when viewed in the direction of the central axis CA (−x direction). The second surface 10*s*2 is disposed around the first surface 10*s*1, covers the end of the clutch plates 83 on the −x direction side, and is substantially perpendicular to the central axis CA. The second surface 10*s*2 protrudes closer to the inboard drive shaft 92 (in the −x direction) than the first surface 10*s*1.

The inboard drive shaft 92 includes an end 92*e* near the differential gear 70 (on the +x direction side). In the direction of the central axis CA, the end 92*e* is positioned between the first surface 10*s*1 and the second surface 10*s*2. That is, the end 92*e* extends toward the differential gear 70 by a distance D1 beyond the second surface 10*s*2. Thus, the inboard drive shaft 92 and the casing 10 overlap each other by the distance D1 in the direction of the central axis CA.

In other words, a recess 10*r* is formed on the surface of the casing 10 that faces the inboard drive shaft 92 by the first surface 10*s*1 and the second surface 10*s*2. When viewed in the direction of the central axis CA, the recess 10*r* is formed in a region within the bore diameter ID of the clutch plates 83. The outside diameter OD of the inboard drive shaft 92 is smaller than the bore diameter ID. That is, the outside diameter OD of the inboard drive shaft 92 is smaller than the diameter of the recess 10*r*. Therefore, it is possible to realize a structure in which the end 92*e* of the inboard drive shaft 92 enters the recess 10*r*.

Effects

In the technology of the present embodiment, the end 92*e* of the inboard drive shaft 92 can be positioned inside the recess 10*r* formed in the casing 10 covering the differential limiting mechanism 80. Thus, it is possible to reduce the size of the drive device 1 in the axial direction (x direction) by an amount corresponding to the distance D1 over which the casing 10 and the inboard drive shaft 92 overlap each other. In the drive device 1 integrated with the differential limiting mechanism 80, it is possible to suppress an increase in the size in the axial direction.

In the technology of the present embodiment, the first plate 85 of the differential limiting mechanism 80 can also function as a member for supporting the bearing 73 for the differential case 70*c*. The number of components can be reduced compared to a case where a dedicated member for supporting the bearing 73 is provided. Therefore, the cost and size of the drive device 1 can be reduced.

Although the embodiment is described in detail above, the embodiment is merely illustrative and is not intended to limit the scope of the claims. The technology described in the claims includes various modifications and alterations of the specific example illustrated above. The technical elements described in the present specification or illustrated in the drawings exhibit technical utility alone or in various combinations, and are not limited to the combinations described in the claims as filed. The technology illustrated in the present specification or the drawings may achieve a plurality of objects at the same time, and has technical utility by achieving one of the objects.

MODIFICATIONS

The casing 10 covering the differential limiting mechanism 80 may be a separate component. For example, a cover that covers the differential limiting mechanism 80 may be fixed to the casing 10 by a fastening member (e.g., a bolt).

The vehicle including the drive device of the present specification is not limited to the battery electric vehicle. The drive device of the present specification can be mounted on, for example, a hybrid electric vehicle or a plug-in hybrid electric vehicle. The drive device of the present specification can also be applied to a vehicle using an electric motor for at least part of traveling, such as a fuel cell electric vehicle.

What is claimed is:

1. A drive device for a vehicle, the drive device comprising:

a motor;

a motor shaft to be driven by the motor;

a planetary gear mechanism including a sun gear, a ring gear, a carrier, and planetary gears, the motor shaft being fixed to the sun gear;

a differential gear including a differential case, the differential case being mechanically connected to the carrier;

a first output shaft including one end connected to the differential gear and the other end passing through the motor shaft;

a second output shaft disposed coaxially with the first output shaft and including one end connected to the differential gear;

an inboard drive shaft fixed to the other end of the second output shaft;

a differential limiting mechanism configured to limit a differential action of the differential gear, the differential limiting mechanism being disposed between the differential gear and the inboard drive shaft and including ring-shaped clutch plates about a central axis of the second output shaft; and a casing that houses the motor, the planetary gear mechanism, the differential gear, and the differential limiting mechanism, wherein an outside diameter of the inboard drive shaft about the central axis is smaller than a bore diameter of the clutch plates, part of the casing is disposed between the differential limiting mechanism and the inboard drive shaft, and covers the differential limiting mechanism, the casing that covers the differential limiting mechanism has a recess on a surface that faces the inboard drive shaft, and an end of the inboard drive shaft is positioned inside the recess.

2. The drive device according to claim 1, wherein the recess is provided in a region within the bore diameter of the clutch plates when viewed in a direction of the central axis.

3. The drive device according to claim 1, wherein:

the casing that covers the differential limiting mechanism includes:

a first surface disposed around the second output shaft and substantially perpendicular to the central axis; and a second surface disposed around the first surface, covering the clutch plates, and substantially perpendicular to the central axis, the second surface protruding closer to the inboard drive shaft than the first surface; and an end position of the inboard drive shaft in a direction of the central axis is between the first surface and the second surface.

4. The drive device according to claim 1, wherein the differential limiting mechanism is configured to switch:

a mode in which the second output shaft is allowed to rotate relative to the differential case; and a mode in which the second output shaft is forbidden to rotate relative to the differential case.

5. The drive device according to claim 1, wherein:

the differential limiting mechanism includes a first plate, a second plate, and a cam ball;

the first plate is fixed to the casing, and has a through hole through which the differential case and the second output shaft pass;

the second plate is disposed to face the first plate in a direction of the central axis, rotatable about the central axis and movable in the direction of the central axis, and mechanically connected to the clutch plates;

the cam ball is sandwiched between the first plate and the second plate; and a bearing that supports the differential case such that the differential case is rotatable relative to the casing is fixed to the first plate near the through hole.

* * * * *